United States Patent
Park et al.

(10) Patent No.: US 9,794,864 B2
(45) Date of Patent: Oct. 17, 2017

(54) METHOD AND APPARATUS FOR SCANNING IN A WIRELESS LAN

(71) Applicant: LG ELECTRONICS INC., Seoul (KR)

(72) Inventors: Giwon Park, Seoul (KR); Jinsam Kwak, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 14/419,226

(22) PCT Filed: Aug. 14, 2013

(86) PCT No.: PCT/KR2013/007323
§ 371 (c)(1),
(2) Date: Feb. 2, 2015

(87) PCT Pub. No.: WO2014/027838
PCT Pub. Date: Feb. 20, 2014

(65) Prior Publication Data
US 2015/0230161 A1    Aug. 13, 2015

Related U.S. Application Data

(60) Provisional application No. 61/683,689, filed on Aug. 15, 2012.

(51) Int. Cl.
*H04W 4/00* (2009.01)
*H04W 48/16* (2009.01)
(Continued)

(52) U.S. Cl.
CPC ............ *H04W 48/16* (2013.01); *H04W 84/12* (2013.01); *H04W 88/08* (2013.01)

(58) Field of Classification Search
CPC ..... H04W 84/12; H04W 80/04; H04W 84/18; H04W 88/06; H04W 74/08
See application file for complete search history.

(56) References Cited

U.S. PATENT DOCUMENTS

| 2005/0064818 A1* | 3/2005 | Assarsson | H04W 74/006 |
| | | | 455/41.2 |
| 2008/0051100 A1* | 2/2008 | Kruys | H04W 48/18 |
| | | | 455/456.1 |

(Continued)

FOREIGN PATENT DOCUMENTS

| KR | 10-2007-0087430 | 8/2007 |
| KR | 10-2009-0011484 | 2/2009 |

(Continued)

OTHER PUBLICATIONS

U.S. Appl. No. 61/605,520 Provisional Specification.*

(Continued)

*Primary Examiner* — Siren Wei
(74) *Attorney, Agent, or Firm* — Lee Hong Degerman Kang & Waimey

(57) ABSTRACT

Disclosed are a method and an apparatus for scanning in a wireless LAN. The method may comprise the following steps: an STA determining identifier information of an AP to be included in a probe request frame as a wildcard SSID and a wildcard BSSID, based on a first MLME; the STA receiving from the AP a frame including information on the BSSID of the AP and the SSID of the AP before a probe delay time expires; the STA determining wither the AP is a target AP based on the BSSID and the SSID; the STA redetermining the identifier information of the AP to be included in the probe request frame based on the BSSID and the SSID, when the AP is the target AP; and the STA unicasting a probe request frame that is re-determined based on the BSSID and the SSID.

12 Claims, 15 Drawing Sheets

(51) Int. Cl.
    *H04W 84/12* (2009.01)
    *H04W 88/08* (2009.01)

(56) References Cited

U.S. PATENT DOCUMENTS

| | | | | |
|---|---|---|---|---|
| 2008/0247377 | A1* | 10/2008 | Van Horn | H04W 52/0225 |
| | | | | 370/348 |
| 2013/0155933 | A1* | 6/2013 | Kneckt | H04W 74/002 |
| | | | | 370/312 |
| 2013/0229995 | A1* | 9/2013 | Cai | H04W 72/10 |
| | | | | 370/329 |
| 2013/0230035 | A1* | 9/2013 | Grandhi | H04W 48/16 |
| | | | | 370/338 |
| 2013/0237216 | A1* | 9/2013 | Ong | H04W 24/10 |
| | | | | 455/434 |

FOREIGN PATENT DOCUMENTS

| | | |
|---|---|---|
| KR | 10-2011-0085836 | 7/2011 |
| KR | 10-2012-0079055 | 7/2012 |

OTHER PUBLICATIONS

U.S. Appl. No. 61/667,648 Provisional Specification.*
PCT International Application No. PCT/KR2013/007323, Written Opinion of the International Searching Authority dated Oct. 25, 2013, 1 page.

* cited by examiner

FIG. 1
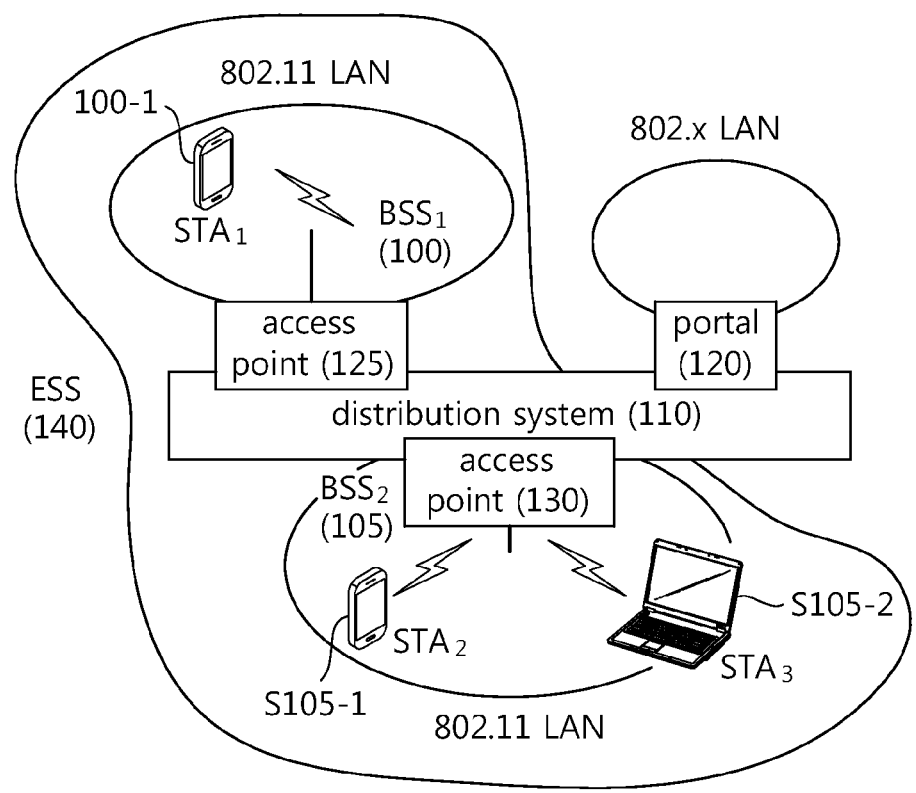
(A)
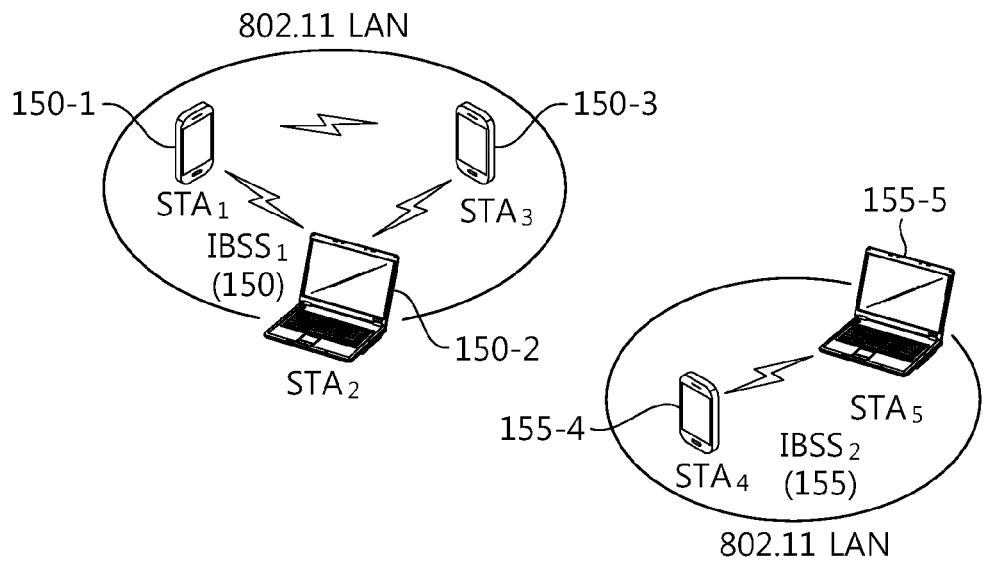
(B)

FIG. 6
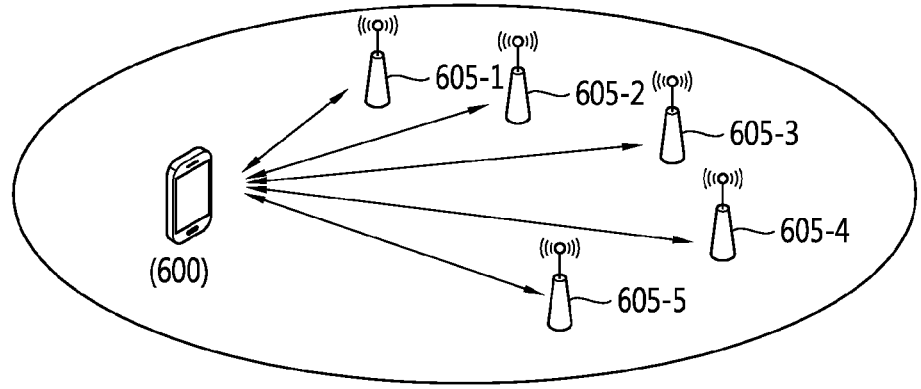
probe request frame (610)
(wildcard, SSID, wildcard BSSID)     (A)
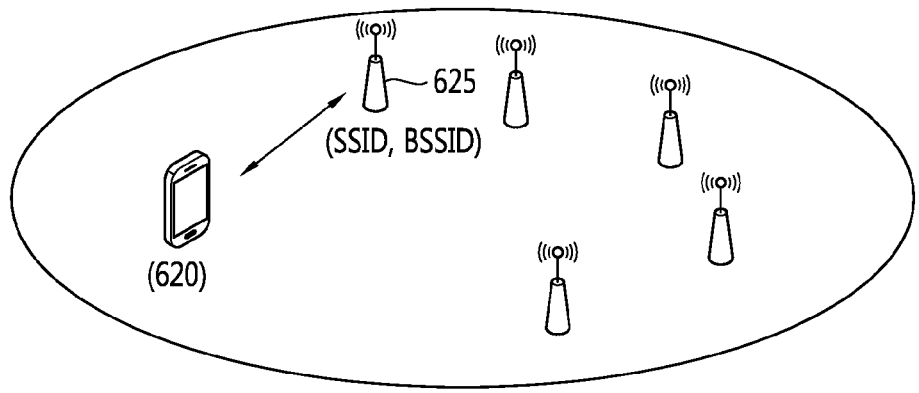
probe request frame(630)
(SSID, BSSID)     (B)
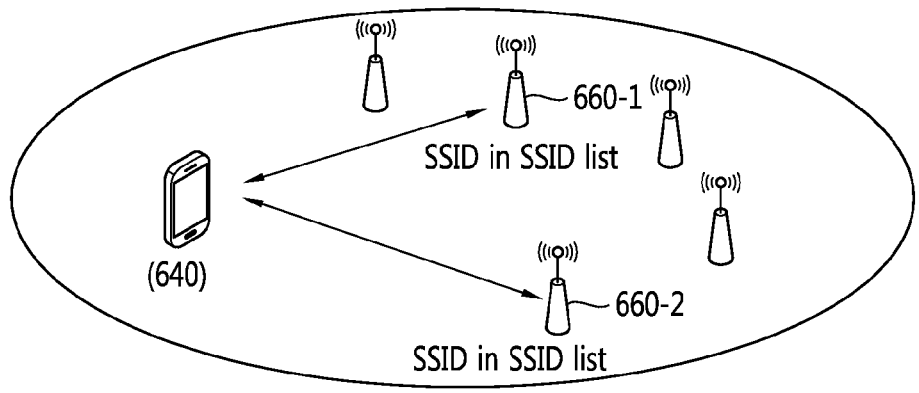
probe request frame (660)
(SSID, wildcard BSSID)     (C)

METHOD AND APPARATUS FOR SCANNING IN A WIRELESS LAN

CROSS-REFERENCE TO RELATED APPLICATIOS

This application is the National Stage filing under 35 U.S.C. 371 of International Application No. PCT/KR2013/007323, filed on Aug. 14, 2013, which claims the benefit of U.S. Provisional Application Ser. No. 61/683,689, filed on Aug. 15, 2012, the contents of which are all hereby incorporated by reference herein in their entirety.

BACKGROUND OF THE INVENTION

Field of the Invention

The present invention relates to a scanning method and apparatus and, more particularly, to a scanning method and apparatus by a station (STA).

Related Art

Recent Wireless LAN (WLAN) technology is basically evolving into three directions. There are Institute of Electrical and Electronic Engineers (IEEE) 802.11ac and IEEE 802.11 ad as efforts to further increase the transfer rate on the extension line of the existing WLAN evolution direction. IEEE 802.11 ad is WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af utilizing a TV White Space (TVWS) band and IEEE 802.11ah utilizing a 900 MHz band. A main object of the wide-area WLANs is to extend extended range Wi-Fi service as well as a smart grid and a wide-area sensor network. Furthermore, the existing WLAN Medium Access Control (MAC) technology is problematic in that an initial link setup time is very long according to circumstances. In order to solve this problem and in order for an STA to rapidly access an AP, IEEE 802.11ai standardization is recently carried out actively.

IEEE 802.11ai is MAC technology in which a rapid authentication procedure is handled in order to significantly reduce the initial setup and association time of a WLAN, and standardization activities for IEEE 802.11 ai has started as a formal task group on January, 2011. In order to enable a rapid access procedure, in IEEE 802.11ai, a discussion on procedure simplification in fields, such as AP discovery, network discovery, Time Synchronization Function (TSF) synchronization, authentication & association, and a procedure convergence with a higher layer, is in progress. From among them, ideas, such as procedure convergence utilizing the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide a scanning method.

Another object of the present invention is to provide an apparatus for performing a scanning method.

In an aspect, a scanning method performed by a station (STA) in a wireless LAN may include receiving, by the STA, a frame including information of a basic service set identifier (BSSID) of an access point (AP) and a service set identifier (SSID) of the AP from the AP before a probe delay time is terminated, determining, by the STA, whether the AP is a target AP based on the BSSID and the SSID, determining, by the STA, identifier information of the AP which is to be included in a probe request frame based on the BSSID and the SSID, if the AP is the target AP, and unicasting, by the STA, the probe request frame which is determined based on the BSSID and the SSID to the AP, wherein a first MLME scan request may include information for transmitting the probe request frame by the STA, wherein the probe delay time may be a time for sensing a channel before the STA transmits the probe request frame, and wherein the target AP may be an AP that the STA is to access initially.

In another aspect, a station (STA) that performs scanning in a wireless LAN may include a radio frequency (RF) unit receiving a wireless signal, and a processor selectively connected to the RF unit, wherein the processor may be configured to perform, receiving a frame including information of a basic service set identifier (BSSID) of an access point (AP) and a service set identifier (SSID) of the AP from the AP before a probe delay time is terminated, determining whether the AP is a target AP based on the BSSID and the SSID, determining identifier information of the AP which is to be included in a probe request frame based on the BSSID and the SSID, if the AP is the target AP, and unicasting the probe request frame which is determined based on the BSSID and the SSID to the AP, wherein a first MLME scan request may include information for transmitting the probe request frame by the STA, wherein the probe delay time may be a time for sensing a channel before the STA transmits the probe request frame, and wherein the target AP may be an AP that the STA is to access initially.

An initial access procedure can be quickly performed.

BRIEF DESCRIPTION OF THE DRAWINGS

FIG. 1 is a conceptual diagram illustrating the configuration of a Wireless Local Area Network (WLAN).

FIG. 6 is a conceptual diagram illustrating a method of transmitting a probe request frame.

DESCRIPTION OF EXEMPLARY EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in FIG. 1(A), a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

FIG. 1(B) is a concept view illustrating an independent BSS.

Referring to FIG. 1(B), the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
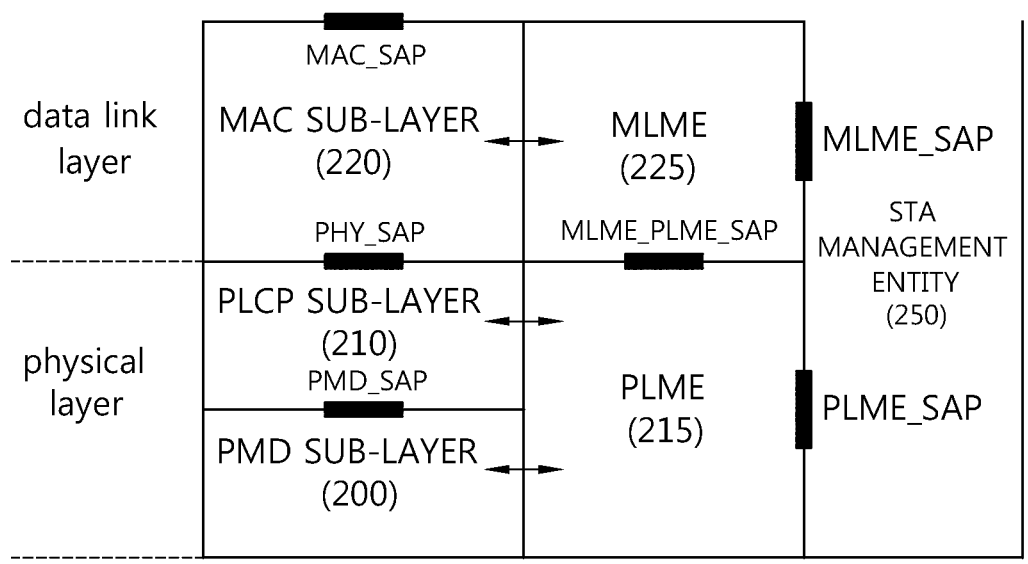
FIG. 2 is a diagram illustrating the hierarchical architecture of a WLAN system that is supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
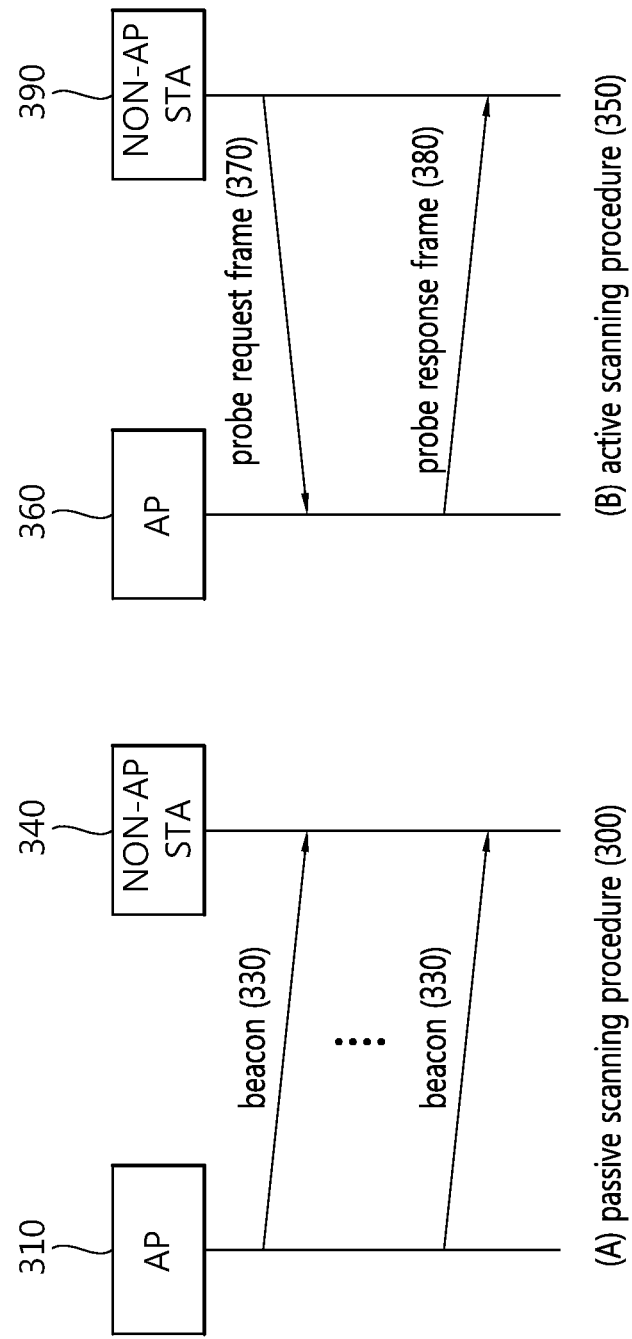
FIG. 3 is a conceptual diagram illustrating a scanning method in a WLAN.

FIG. 3 is a concept view illustrating a scanning method in a WLAN.

Referring to FIG. 3, the scanning method may be divided into passive scanning 300 and active scanning 350.

Referring to FIG. 3(A), the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a discovery frame may be defined. The discovery frame is a frame transmitted between each of the transmission periods in each AP, may be a frame transmitted with a shorter period than the beacon frame. That is, the discovery frame is a frame transmitted with a shorter period than a transmission period of the beacon frame. The discovery frame may include identification information (the SSID and the BSSID) of an AP that transmits the discovery frame. It may be implemented that the discovery frame is transmitted to an STA before the beacon frame is transmitted, and thus, the STA may discovery that an AP is existed in the corresponding channel beforehand. An interval of which the discovery frame is transmitted in one AP is referred to as a discovery frame transmission interval. The discovery frame may be transmitted with a part of information included in the beacon frame being included.

Referring to FIG. 3(B), the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
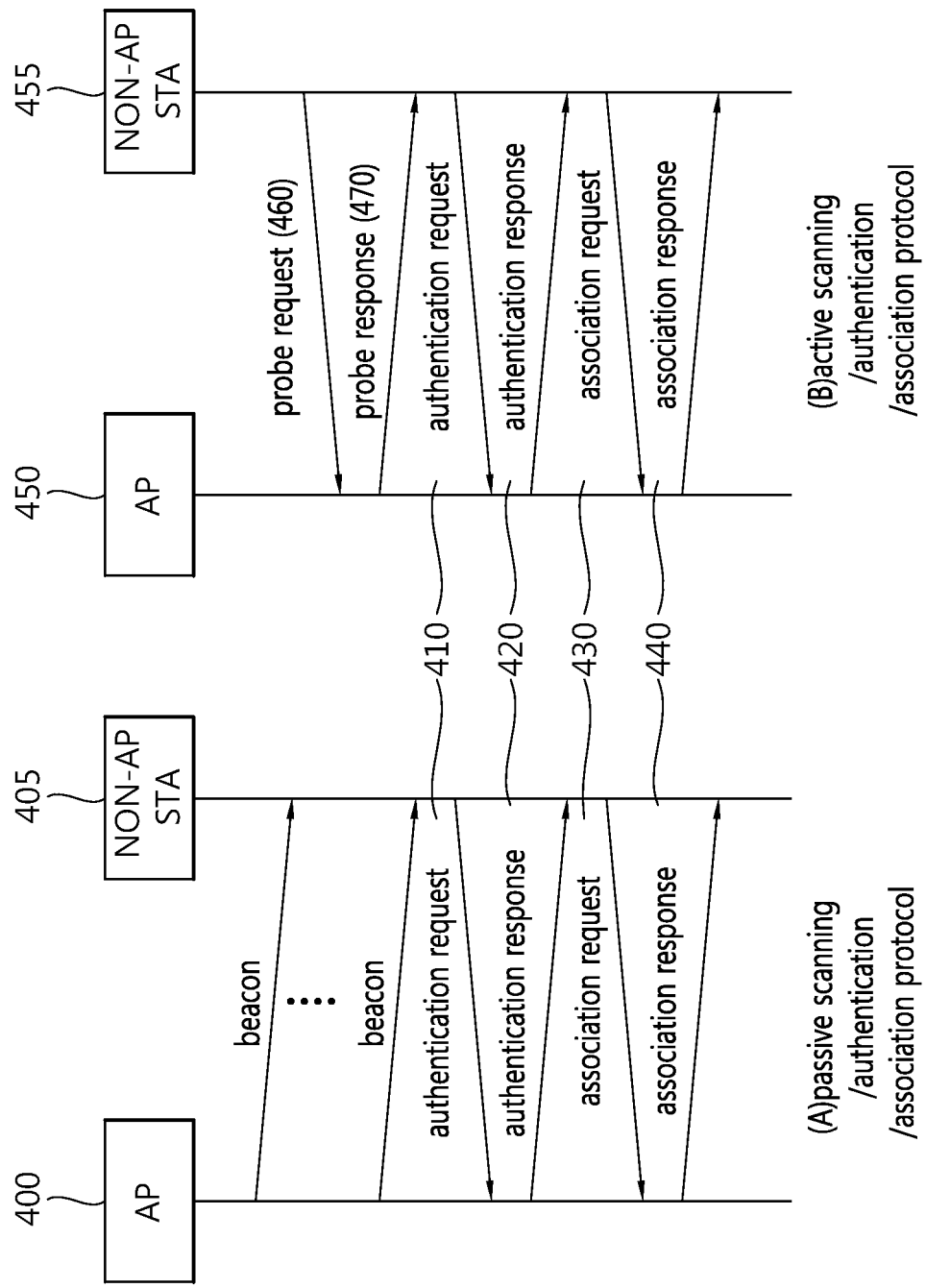
FIG. 4 is a conceptual diagram illustrating authentication and association processes after the scanning of an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. FIG. 4(A) is a concept view illustrating an authentication and association process after passive scanning, and FIG. 4(B) is a concept view illustrating an authentication and association after active scanning.

The authentication and association process may be equally performed by exchanging an authentication request frame 410/authentication response frame 420 and an association request frame 330/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
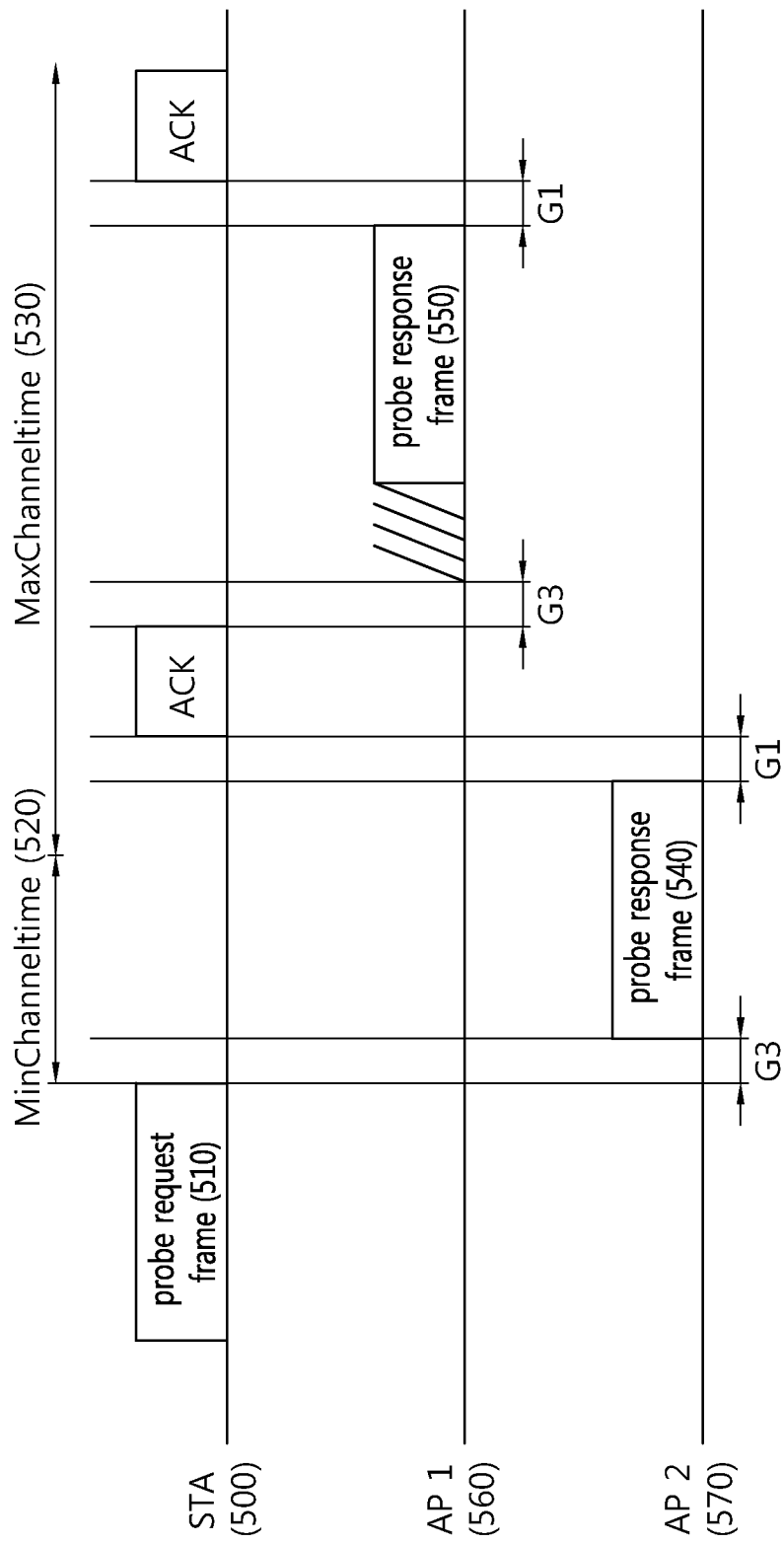
FIG. 5 is a conceptual diagram illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until the probe timer reaches the minimum channel time 520, the STA 500 shifts scanning channels to perform scanning on other channel. In case the STA 500 receives the probe response frame 550 until the probe timer reaches the minimum channel time 520, it may process the received probe response frames 540 and 550 after waiting until the probe timer reaches the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

FIG. 6 is a concept view illustrating a probe request frame transmission method.

FIG. 6 discloses methods of broadcasting, multicasting, and unicasting probe request frames from an STA.

FIG. 6(A) shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

FIG. 6(B) shows a method in which the STA 620 unicasts the probe request frame 630.

Referring to FIG. 6(B), in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

FIG. 6(C) shows a method in which the STA 640 multicasts the probe request frame 660.

Referring to FIG. 6(C), the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

In performing the scanning procedure, the STA may sense a channel during the probe delay interval and sense if there is a frame received through the channel.

The conventional active scanning procedure will be described in detail below. The STA may receive an MLME- SCAN-request primitive that instruct an active scanning generated in the MLME. The STA may determine a method (unicast, multicast or broadcast) for transmitting the probe request frame based on the MLME-SCAN-request primitive, and also, determine the BSSID and SSID that will be included in the probe request frame.

The STA may determine whether the probe delay time is terminated and a valid frame is received through the PHY layer of the STA. The probe delay may be used as a channel discovery interval which is used before transmitting the probe request frame by the STA that performs the active scanning. For example, in case that a valid frame is received through the PHY layer, the PHY layer of the STA may generate a specific primitive (e.g., PHYRxStart.indication primitive) and transmit it to the MAC layer. If the probe delay time is terminated and a valid frame is received through the PHY layer of the STA, the STA may perform the channel access to transmit the probe request frame to the channel. If the channel access is successful, the STA may transmit the probe request frame.

The STA may transmit the probe request frame and setup a probe timer. The STA may measure a channel state until the probe timer reaches a minimum channel time (MinChannelTime). In case that the measurement result of the channel state is not busy, the STA may setup the NAV to 0 and scan other channels. In case that the measurement result of the channel state is busy, the STA may receive the probe response frame from the channel until the probe timer reaches to a maximum channel time (MaxChannelTime). If the probe timer reaches the maximum channel time, the STA may process all of the received probe response frames. Whether the channel state that the STA senses is busy or not may be determined based on a PHY-CCA.indication primitive generated in the PHY layer of the STA.

An AP that receives the probe request frame transmitted by the STA transmits the probe response frame to the STA that transmits the probe request frame. A case may be assumed that the STA broadcasts or multicasts the probe request frame. In such a case, when there are many APs around the STA, unnecessary many APs respond to the STA through the probe response frame, which causes not only unnecessary to waste of resources but to slower a speed of the scanning procedure of the STA.

The present invention introduces a scanning method performed by an STA to solve the problem of flooding phenomenon of the probe response frame that too many probe response frame are transmitted to the STA. In case that the STA satisfies a predetermined condition, the STA transmits the probe request frame by unicasting, not by broadcasting or multicasting, or not transmitting the probe request frame, and accordingly, the use of unnecessary channel is prevented and the scanning procedure can be quickly performed.

Figure 7:
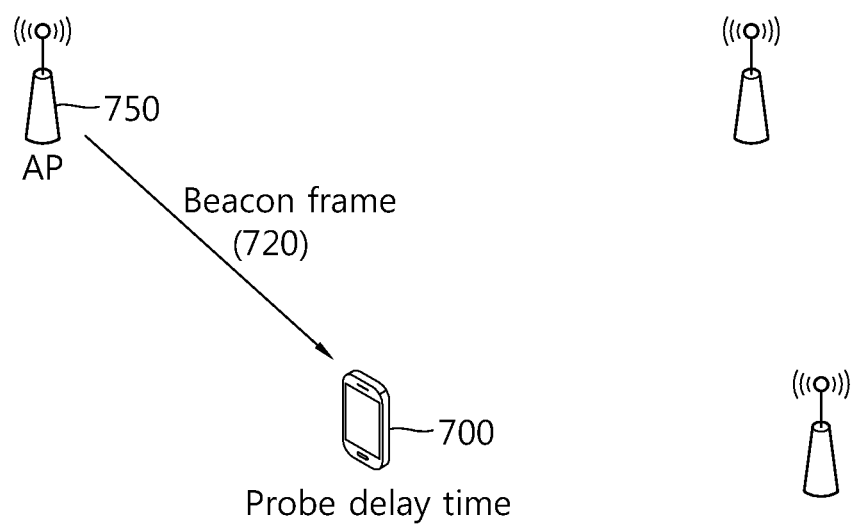
FIG. 7 is a conceptual diagram illustrating a scanning method according to an embodiment of the present invention.

FIG. 7 is a conceptual diagram illustrating a scanning method according to an embodiment of the present invention.

Referring to FIG. 7, an STA that performs the active scanning may receive a frame transmitted through a channel until a probe delay time is terminated. In case that the probe delay time is terminated and a conventional STA receives a valid frame until the probe delay time is terminated, the STA may transmit the probe request frame through an access procedure.

According to the embodiments of the present invention, it may be determined whether an STA 700 receives a beacon frame 720 from a target AP until the probe delay time is terminated. If the STA 700 receives the beacon frame 720 from the target AP, the STA may not transmit the probe request frame even after the probe delay time is terminated. If the STA 700 acquires information of the target AP by receiving the beacon frame 720 from the target AP, the STA 700 may quickly complete the scanning procedure by not transmitting a separate probe request frame to the AP.

On the other hand, if the STA 700 is unable to receive the beacon frame 720 from the target AP until the probe delay time is terminated, the STA 700 may transmit the probe request frame according to the conventional active scanning procedure. The target AP may be a target AP to which the STA 700 is going to transmit the probe request frame. The target SSID and the target BSSID may be defined as terminologies indicating the SSID and the BSSID of the target AP.

In order to determine whether the STA 700 receives the beacon frame 720 from the target AP, the STA 700 may use various methods. For example, based on the AP identifier information (e.g., the BSSID and the SSID) through which the beacon frame 720 is transmitted, it may determined whether an AP 750 that transmits the beacon frame 720 is a target AP.

The STA 700 may determine whether the SSID information of the AP 750 that transmits the beacon frame is the same as the target SSID, and based on this, may determine whether to transmit the probe request frame. As another example, the STA 700 may determine whether the AP 750 that transmits the beacon frame is the target AP by determining whether the BSSID and SSID information of the AP 750 that transmits the beacon frame is the same as the target BSSID and the target SSID.

As a result of the determination, in case that the STA 700 receives the beacon frame of the target AP, the STA 700 may not transmit the probe request frame.

In order to determine whether the frame received by the STA 700 is transmitted from the target AP, the following method in detail may be used.

For example, the STA 700 may determine identifier information of the target AP based on the AP identifier information (e.g., the BSSID and the SSID) indicated from MLME-SCAN.request primitive. The STA 700 may determine a method of transmitting the probe request frame which is to be transmitted later the probe delay interval and information included in the probe request frame based on the AP identifier information indicated by MLME-SCAN.request primitive.

The STA 700 may determine whether the beacon frame 720 is a frame transmitted from the target AP based on the identifier information of AP 750 that transmits the beacon frame 720 and the AP identifier information indicated by MLME-SCAN.request primitive. For example, if the AP identifier information included in MLME-SCAN.request primitive and the identifier information of the AP 750 that transmits the beacon frame 720 in the probe delay interval is included, the STA 700 may determine the AP 750 that transmits the beacon frame 720 to be the target AP. For example, if the AP identifier information included in MLME-SCAN.request primitive and the identifier information of the AP 750 that transmits the beacon frame 720 are identical, the STA 700 may determine the AP 750 that transmits the beacon frame 720 to be the target AP. In addition, even if the AP identifier information included in MLME-SCAN.request primitive is a wild card SSID and/or a wild card BSSID, and the identifier information of the AP 750 that transmits the beacon frame 720 is identifier information of a specific AP, the STA 700 may determine the AP 750 that transmits the beacon frame 720 to be the target AP.

As another example, in order to determine whether the STA 700 receives the beacon frame from the target AP, the STA 700 may not use the AP identifier information included in MLME-SCAN.request primitive. For example, if the STA 700 does not know the information on whether there exists a neighboring target AP, the STA 700 may preferentially receive the probe response frame from neighboring APs by broadcasting or multicasting. For example, if the STA 700 may specify the AP identifier information of the target AP but it is not certain whether there exists a neighboring target AP, the STA 700 may configured to transmit the probe request frame determined by the wild card BSSID or the wild card SSID. In such a case, in order to determine whether the beacon frame is received from the target AP, the STA 00 may compare the identifier information of the AP 750 that transmits the beacon frame 720 with the information of target AP determined through separate determination of the STA 700, not with the information indicated by MLME-SCAN.request primitive.

That is, even though the STA 700 is configured by the wild card BSSID and/or the wild card SSID in MLME-SCAN.request primitive, the STA 700 may determine whether the received beacon frame is a frame transmitted from the target AP based on the information of target AP separately determined by the STA 700.

Also, as the information to determine whether the beacon frame is additionally received from the target AP, other information (e.g., operating performance information of AP, operating channel information of AP, etc.) related to the AP 750 as well as the identifier information of the AP 750 may be used. For example, although the STA 700 may determine the AP 750 that transmits the beacon frame 720 to be the target AP through only the identifier information of the AP 750 that transmits the received beacon frame, the STA 700 may determine the AP 750 that transmits the beacon frame 720 to be the target AP by additionally determining other information (e.g., operating performance information of AP, operating band information of AP, operating channel information of AP, etc.) related to the AP 750.

Such a method of determining target AP by the STA may be applied to the embodiments of the present invention that will be described below.

Figure 8:
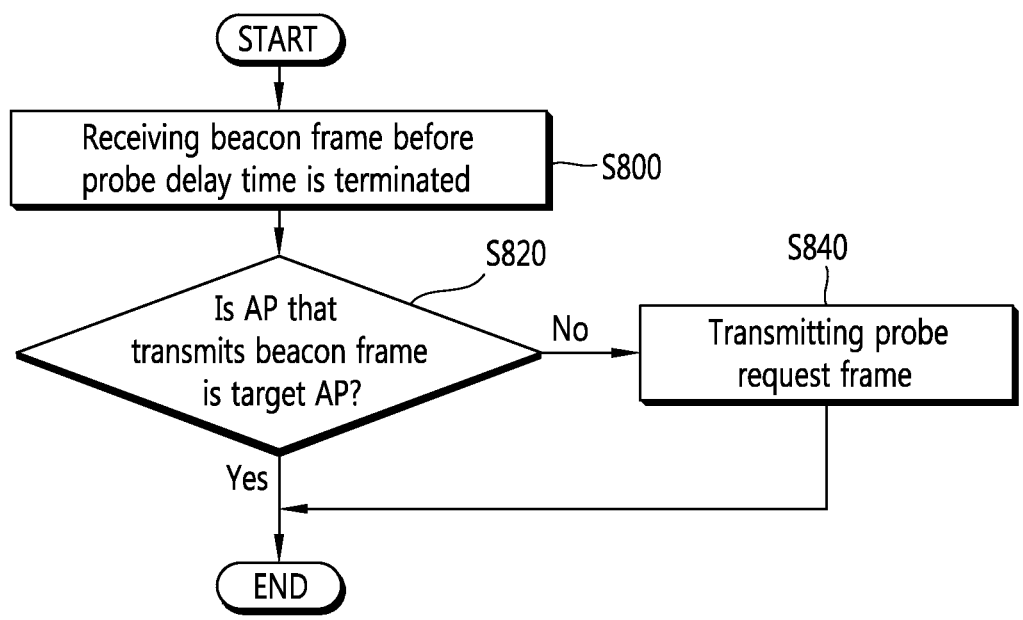
FIG. 8 is a flow chart illustrating a determination on whether to transmit the probe request frame by an STA according to an embodiment of the present invention.

FIG. 8 is a flow chart illustrating a determination on whether to transmit the probe request frame by an STA according to an embodiment of the present invention.

Referring to FIG. 8, an STA receives the beacon frame before the probe delay time is terminated (step, S800).

The STA that performs an active scanning may receive a frame transmitted through a channel before the probe delay time is terminated before transmitting the probe request frame. For example, the STA may receive the beacon frame that an AP transmits before the probe delay time is terminated. In the beacon frame, the identifier information of the AP that transmits the beacon frame may be included.

Whether the AP that transmits the beacon frame is the target frame is determined (step, S820).

The STA may use various methods in order to determine whether the AP that transmits the beacon frame is the target AP. For example, by comparing the identifier information of the target AP and the identifier information of the AP that transmits the beacon frame, it may be determined whether the AP that transmits the beacon frame is the target AP. In addition to this, various methods for determining target AP described in FIG. 7 may be used.

If the AP that transmits the beacon frame is not the target AP, the probe request frame is transmitted (step, S840).

If the AP that transmits the beacon frame is not the target AP, the STA may transmit the probe request frame.

On the other hand, if the STA receives the beacon frame from the target AP, the STA may acquire the information of AP even though the STA does not transmit separate probe request frame. Accordingly, the STA may not transmit the probe request frame.

Figure 9:
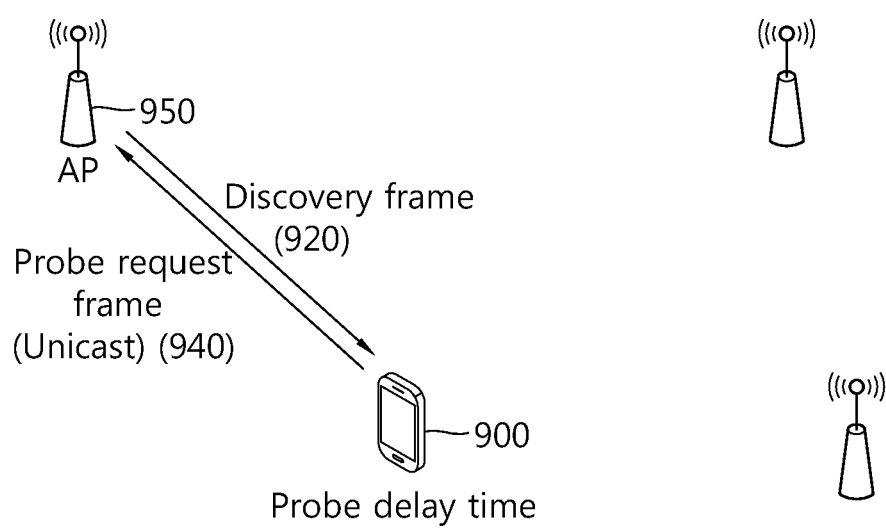
FIG. 9 is a conceptual diagram illustrating a scanning method according to an embodiment of the present invention.

FIG. 9 is a conceptual diagram illustrating a scanning method according to an embodiment of the present invention.

In FIG. 9, a method of unicasting a probe request frame 940 is described by receiving a discovery frame 920 in a probe delay interval by an STA 900 and based on the identifier information of an AP 950 that transmits the discovery frame 920.

In case of the conventional STA, if the wild card SSID and the wild card BSSID are included in MLME-SCAN.request primitive, the STA may broadcast the probe request frame. Additionally, if the SSID list and the wild card BSSID are included in MLME-SCAN.request primitive, the STA may multicast the probe request frame. That is, in case that the BSSID and the SSID are configured as such, the STA that performs the active scanning may multicast or broadcast the probe request frame after the probe delay time.

According to an embodiment of the present invention, even in case that it is determined to multicast or broadcast the probe request frame based on MLME-SCAN.request primitive that the STA 900 receives, if the STA receives the discovery frame 920 from the target AP before the probe delay time is terminated, the STA may unicast the probe request frame 940.

In the discovery frame 920, various information such as the identifier information (the SSID or the BSSID) of the AP that transmits the discovery frame 920 and a next target beacon transmission time (TBTT) offset. The next TBTT offset may include information of a time offset that transmits the beacon frame following the discovery frame 920. The STA may acquire the information of time when the beacon frame is transmitted following the discovery frame 920 based on the next TBTT offset. The STA 900 may perform the scanning procedure by receiving the beacon frame following the discovery frame 920.

The STA 900 may determine whether the discovery frame 920 is transmitted from the AP that corresponds to the target SSID and the target BSSID (i.e., whether the discovery frame is transmitted from the target AP) as follows.

If the wild card SSID and the wild card BSSID are designated to MLME-SCAN.request primitive, the STA 900 may determine to receive the discovery frame 920 including the target SSID and the target BSSID, and determine the AP that transmits the discovery frame to be the target AP.

In addition, if the wild card SSID and the wild card BSSID are designated to MLME-SCAN.request primitive and the SSID of the AP 950 that transmits the discovery frame is one SSID among the SSID list of MLME-SCAN.request primitive, the STA 900 may determine to receive the discovery frame 920 including the target SSID and the target BSSID, and the STA 900 may determine the AP 950 that transmits the discovery frame 920 to be the target AP.

If the AP 950 that transmits the discovery frame 920 is determined to be target AP, the STA 900 may regenerate the probe request frame based on the identifier information of the AP 950 that transmits the discovery frame 920. For example, in the MLME layer, MLME-SCAN.request primitive including new AP identifier information may be regenerated based on the information included in the received discovery frame 920. The STA 900 may unicast the probe request frame 940 to the target AP by regenerating the probe request frame based on the regenerated MLME-SCAN.request primitive. That is, the STA 900 may unicast the reconfigured probe request frame 940 to the AP 950 that transmits the discovery frame 920, which is the target AP, based on the AP 950 that transmits the discovery frame 920. The AP 950 that transmits the discovery frame 920, which is the target AP, may transmit the probe response frame to the STA 900 in response to the probe request frame 940.

By using such a method, the STA 900 may perform the scanning procedure by receiving only the probe response frame of the target AP, not receiving the probe response frame from several APs.

In addition, in the embodiment of the present invention, in order to determine whether the AP 950 that transmits the discovery frame 920 is the target AP, the STA 900 may also determine whether the AP 950 that transmits the discovery frame 920 to be the target AP based on the information of the target AP determined by the STA 900, not MLME-SCAN-.request primitive. A case may be existed that a basic configuration of the STA 900 is to configure the BSSID to be a wild card and the SSID to be a wild card by the AP identifier information of MLME-SCAN.request primitive to broadcast the probe request frame. In such a case, the STA 900 may determine whether the AP 900 that transmits the discovery frame 920 is the target AP based on the target AP information separately determined by the STA 900, not by MLME-SCAN.request primitive in order to determine whether the AP 950 that transmits the discovery frame 920 is the target AP.

In summary, the STA may determine the identifier information of the AP which is to be included in the probe request frame to be the wild card SSID and the wild card BSSID based on a first MLME scan request primitive. The STA may receive a frame including the information on the BSSID of AP and the SSID of AP from the AP before the probe delay time is terminated. In this case, the STA may determine whether the AP is the target AP based on the BSSID and the SSID. If the AP is the target AP, the STA may re-determine the identifier information of the AP which is to be included in the probe request frame based on the BSSID and the SSID. The STA may unicast the re-determined probe request frame to the AP based on the BSSID and the SSID.

In order for the STA to re-determine the identifier information which is to be included in the probe request frame, the STA may generate a second MLME scan request primitive based on the BSSID and the SSID. The STA may determine the identifier information of the target AP which is to be included in the probe request frame to be the BSSID and the SSID based on the generated second MLME scan request primitive. In the first MLME scan request primitive and the second MLME scan request primitive, information that indicates to perform the active scanning by the STA may be included. The frame including the information on the BSSID of AP and the SSID of AP received by the STA may be the discovery frame or the beacon frame, but also may be a frame overheard by the STA. A method of transmitting the probe request frame by overhearing the frame by the STA will be described below.

Figure 10:
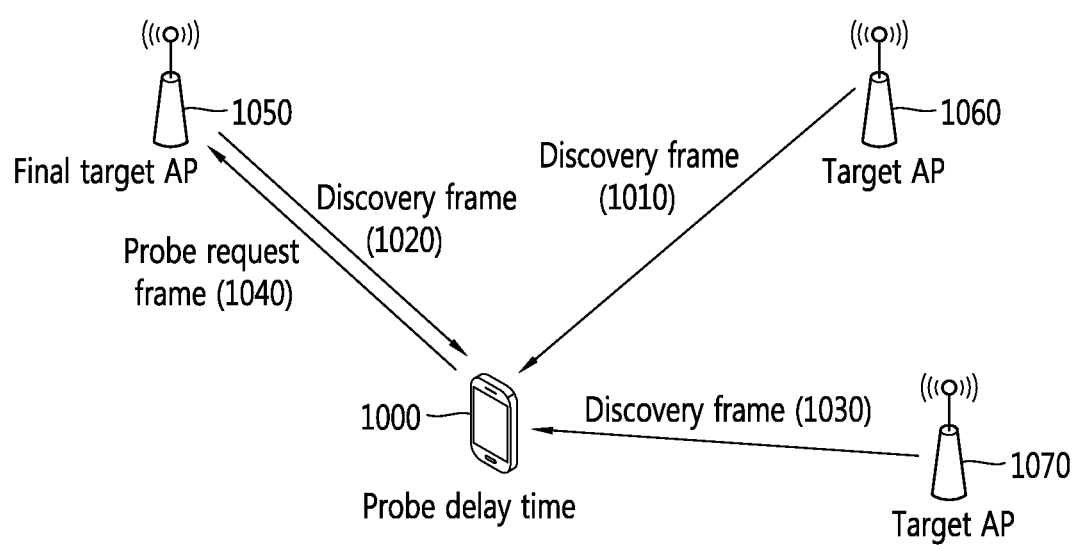
FIG. 10 is a conceptual diagram illustrating a scanning method by an STA according to an embodiment of the present invention.

FIG. 10 is a conceptual diagram illustrating a scanning method by an STA according to an embodiment of the present invention.

FIG. 10 is a conceptual diagram illustrating a case that an STA 1000 receives a plurality of discovery frames 1010, 1020 and 1030 before the probe delay time is terminated.

Referring to FIG. 10, the STA 1000 may select one AP 1050 among a plurality of APs 1050, 1060 and 1070 to be a final target AP, if there exist a plurality of target APs 1050, 1060 and 1070 that transmit discovery frames 1010, 1020 and 1030. As a method of determining the target AP by the STA 1000, the method same as FIG. 9 described above may be used. The STA 1000 may unicast a probe request frame 1040 to the selected final target AP 1050.

In order for the STA 1000 to determine the final target AP to unicast, various methods may be used. For example, based on a received signal strength indicator (RSSI) that includes information of received signal strength of the received discovery frames 1010, 1020 and 1030, the target AP 1050 that transmits the discovery frame 1020 of the strongest signal may be determined as the final target AP.

As another method, based on additional support information of AP such as information on a channel bandwidth, information on the number of stream to support and minimum data rate to support included in the discovery frame 1010, 1020 and 1030, the final target AP may also be determined The STA 1000 may unicast the probe request frame to the determined final target AP 1050.

Figure 11:
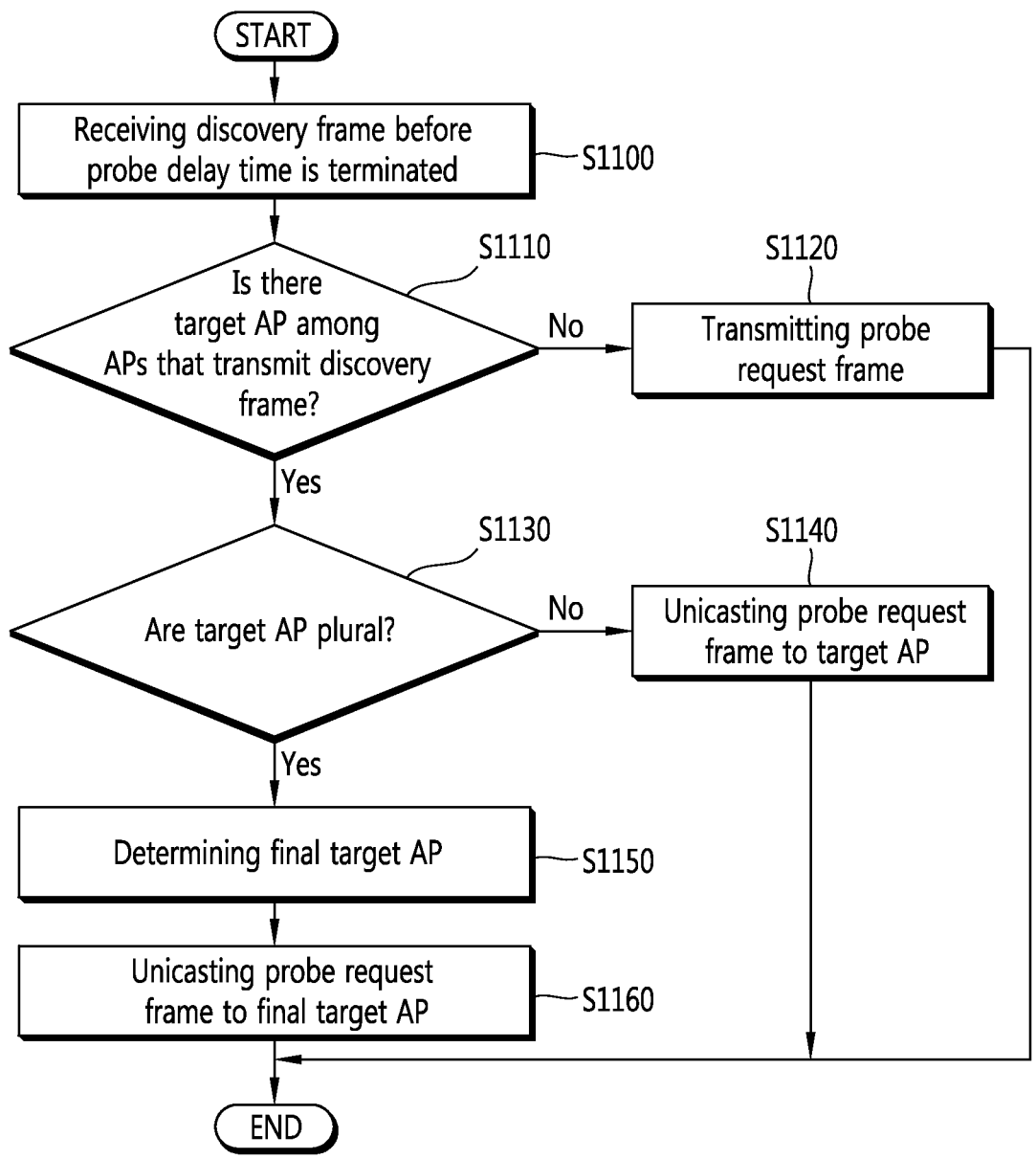
FIG. 11 is a flow chart illustrating a method of unicasting the probe request frame by an STA according to an embodiment of the present invention.

FIG. 11 is a flow chart illustrating a method of unicasting the probe request frame by an STA according to an embodiment of the present invention.

Referring to FIG. 11, an STA receives a plurality of discovery frames before the probe delay time is terminated (step, S1100).

The STA may receive a plurality of discovery frames that an AP transmits before the probe delay time is terminated.

Whether there exists a target AP among the APs that transmits the beacon frame is determined (step, S1110).

The STA may use the method describe above with reference to FIG. 10 in order to determine the AP that transmits the beacon frame is the target AP.

If there does not exist a target AP among the APs that transmit the beacon frame, the probe request frame is transmitted (step, S1120).

If there is the target AP among the APs that transmit the beacon frame, whether the number of target AP is plural is determined (step, S1130).

As result of determination of step, S1130, if there is one target AP that transmits the beacon frame, the probe request frame may be unicasted to the target AP (step, S1140).

As result of determination of step, S1130, if there is a plurality of target APs that transmit the beacon frame, one AP among the plurality of target APs is determined as the final target AP (step, S1150).

In order to determine the final target AP among the plurality of APs, various methods may be used. For example, the AP that transmits the discovery frame having the strongest RSSI among the plurality of APs may be determined as the final target AP.

The probe request frame is unicasted to the final target AP (step, S1160).

The STA may unicast the probe request frame to the final target AP.

Figure 12:
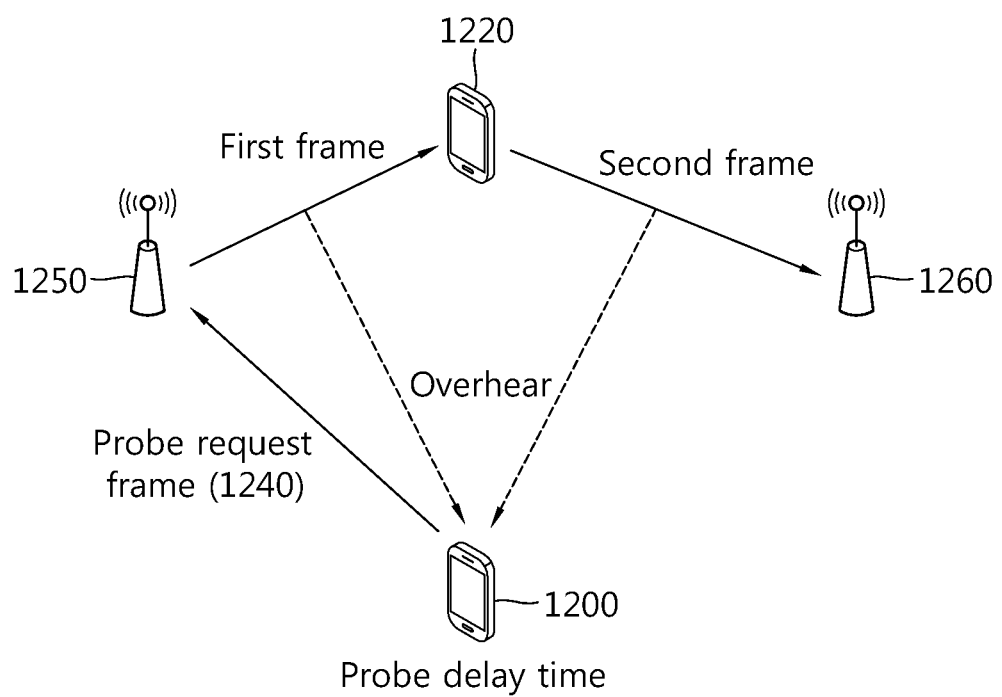
FIG. 12 is a conceptual diagram illustrating a scanning method by an STA according to an embodiment of the present invention.

FIG. 12 is a conceptual diagram illustrating a scanning method by an STA according to an embodiment of the present invention.

In FIG. 12, a method of determining whether to unicast a probe request frame 1240 by overhearing a frame that APs 1250 and 1260 transmit performed by an STA 1200 is described.

Referring to FIG. 12, the STA 1200 may overhear the frame that the AP 1250 transmits to another STA 1220 in BSS or the frame that another STA 1220 transmits to the AP 1260.

The STA 1200 may acquire information of the AP 1250 that transmits the frame through MAC header of the overheard frame or the AP 1260 which is going to receive the frame. The AP 1250 that transmits the frame through MAC header or the AP 1260 which is going to receive the frame may be defined by a terminology of overheard AP.

The STA 1200 may determine whether the MAC address of the APs 1250 and 1260 acquired based on the overheard frame and the MAC address of a target AP are identical. As a result of the determination, if the MAC address of the APs 1250 and 1260 which is acquired and the MAC address of a target AP are identical, the STA 1200 may determine the overheard AP to be the target AP. The STA 120 may perform the scanning procedure by unicasting the probe request frame 1240 to the determined target AP 1250.

Figure 13:
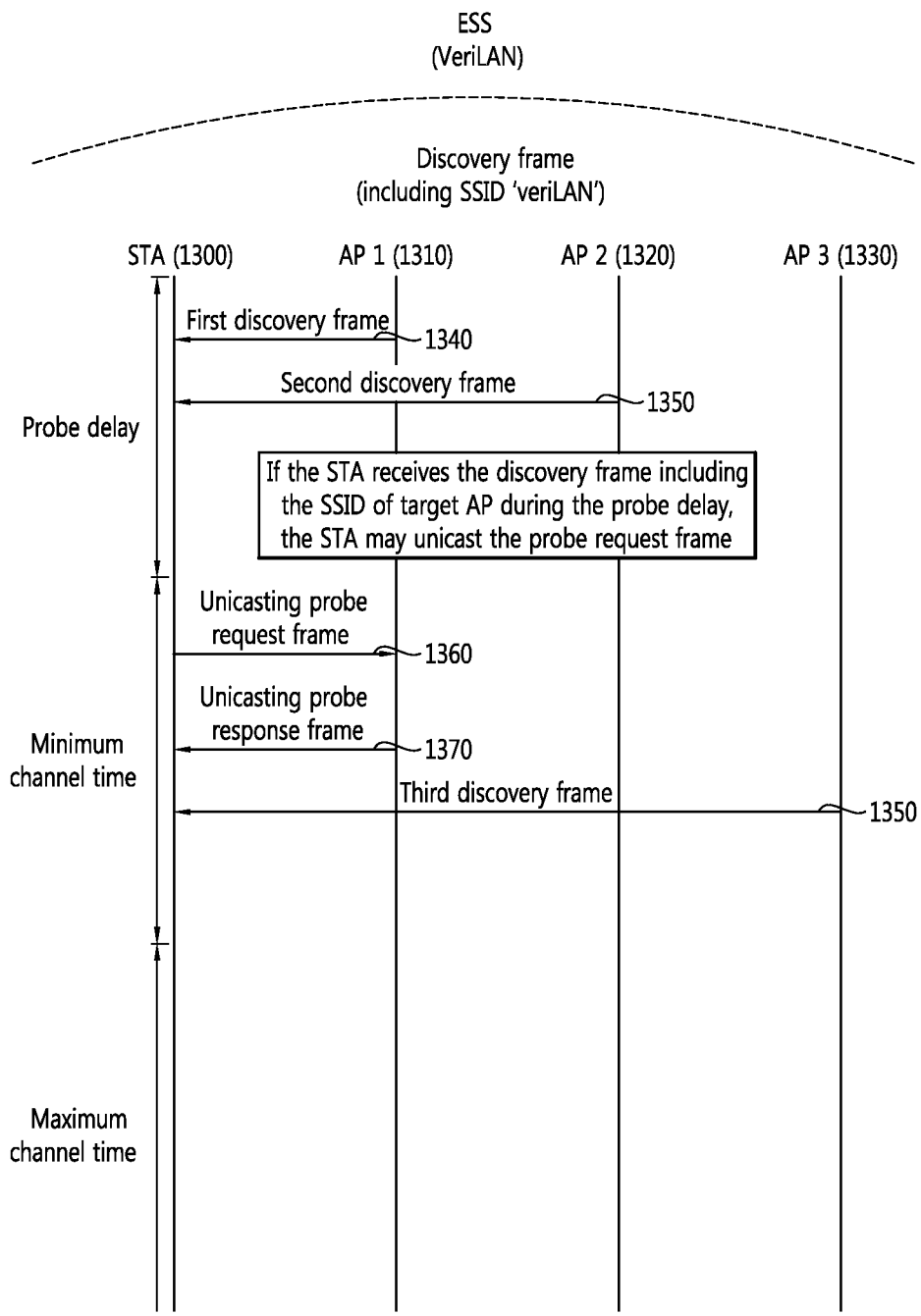
FIG. 13 is a conceptual diagram illustrating a scanning method by an STA according to an embodiment of the present invention.

FIG. 13 is a conceptual diagram illustrating a scanning method by an STA according to an embodiment of the present invention.

In FIG. 13, an operation of an STA 1300 that operates in one ESS sharing an identical SSID, e.g., VeriLAN, is exemplary described. SSIDs of APs 1310, 1320 and 1330 operate in one ESS may have an identical value.

Referring to FIG. 13, the STA 1300 may receive a first discovery frame 1340 from a first AP 1310 during the probe delay. The SSID included in the first discovery frame 1340 has an identifier, 'VeriLAN'. In addition, the STA 1300 may receive a second discovery frame 1350 from a second AP 1320 during the probe delay. The SSID included in the second discovery frame 1350 has an identifier, 'VeriLAN'.

The STA 1300 may determine whether the target AP is existed among the AP that transmits the received first discovery frame 1340 and second discovery frame 1350. In case that the target SSID of the target AP of the STA 1300 is 'VeriLAN', the STA 1300 may perform the operation started when receiving the discovery frame from the plurality of target APs described above. For example, the STA 1300 may select the AP that transmits a discovery frame of which signal strength which is received is greater among the received first discovery frame 1340 and second discovery frame 1350. If the signal strength of the first discovery frame 1340 is greater, the probe request frame 1360 may be unicasted to the first AP 1310 that transmits the first discovery frame 1340. The first discovery frame 1310 may transmit a probe response frame 1370 in response to the probe request frame 1360 to the STA.

Figure 14:
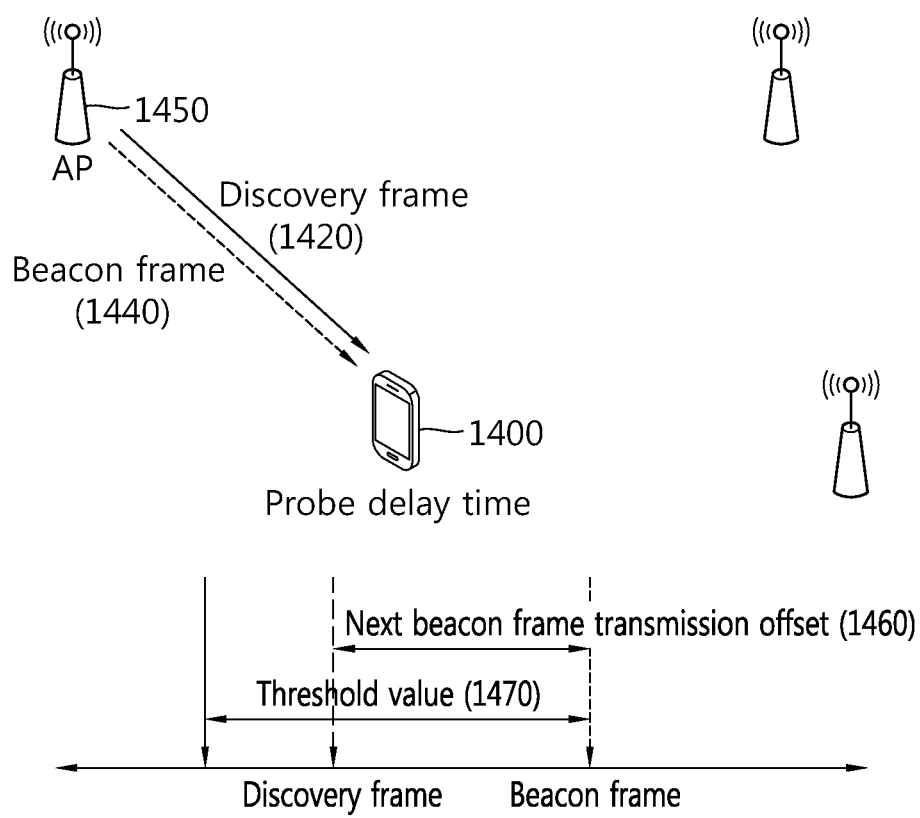
FIG. 14 is a conceptual diagram illustrating a scanning method by a user equipment according to an embodiment of the present invention.

FIG. 14 is a conceptual diagram illustrating a scanning method by a user equipment according to an embodiment of the present invention.

Referring to FIG. 14, an STA 1400 may receive a beacon frame 1440, not unicast the probe request frame even in case of receiving a discovery frame 1420 from a target AP 1450.

The STA 1400 may know a transmission time of the beacon frame 1440 which is to be transmitted next in the target AP based on information of a next beacon frame transmission offset 1460 included in the discovery frame 1420 after receiving the discovery frame 1420. In case that a time when the next beacon frame is to be transmitted is below a threshold value 1470, the STA 1400 may perform a scanning by the method of receiving the beacon frame that the target AP 1450 transmits, not transmitting the probe request frame. For example, if the next beacon frame transmission offset is below the threshold value 1470, the STA 1400 may perform faster scanning by receiving the beacon frame 1440 that the target AP 1450 transmits rather than transmitting the probe request frame and receiving a response to it.

That is, the STA 1400 may perform a determination on whether to transmit the probe request frame to the target AP 1450 based on the next beacon frame transmission offset. The threshold value may be configured as various values according to an implementation of the user equipment.

Figure 15:
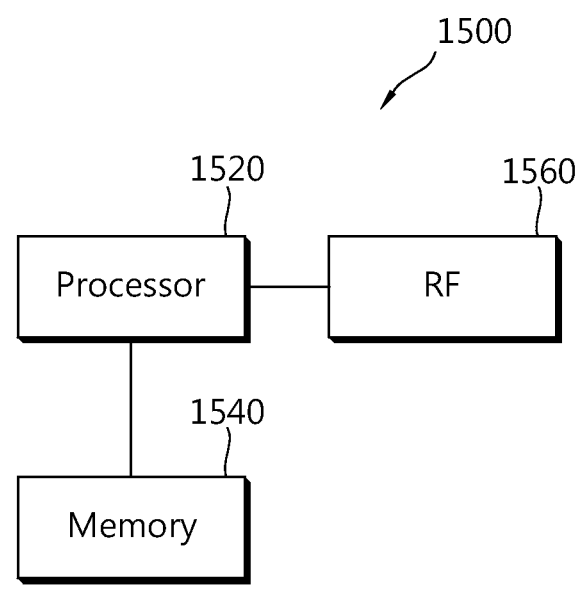
FIG. 15 is a block diagram illustrating the wireless apparatus in which an embodiment of the present invention can be implemented.

FIG. 15 is a block diagram illustrating the wireless apparatus in which an embodiment of the present invention can be implemented.

Referring to FIG. 15, the wireless apparatus 1500 is an STA that may implement the embodiments described above, and may also be an AP or non-AP station.

The wireless apparatus 1500 includes a processor 1520, a memory 1540 and a radio frequency (RF) unit 1560.

The RF unit 1560 may be connected to the processor 1520 and transmits/receives the radio signal.

The processor 1520 implements the proposed functions, processes and/or methods. For example, the processor 1520 may be configured to perform the operation of the wireless apparatus according to the embodiments of the present invention described above.

For example, in case that the wireless apparatus is an AP, the processor 1520 may be implemented to determine whether to accept an STA and to transmit a scanning frame that includes scanning realignment information to the STA.

In addition, in case that the wireless apparatus is an STA, the processor 2120 may be implemented to receive the scanning frame that includes the scanning realignment information, and based on this, to perform an initial access operation by switching to a different neighbor AP, a different band or a different channel.

The processor 1520 may include Application-Specific Integrated Circuits (ASICs), other chipsets, logic circuits, data processors and/or convertors that reciprocally convert baseband signals and radio signals. The memory 1540 may include Read-Only Memory (ROM), Random Access Memory (RAM), flash memory, memory cards, storage media and/or other storage devices. The RF unit 1560 may include one or more antennas to transmit and/or receive the radio signal.

When the embodiment is implemented in software, the aforementioned scheme may be implemented as a module (process or function) that performs the aforementioned function. The module may be stored in the memory 1540 and executed by the processor 1520. The memory 1540 may be placed inside or outside the processor 1520 and may be connected to the processor 1520 using a variety of well-known means.

What is claimed is:

1. A method for scanning in a wireless local area network (WLAN), comprising:

receiving, by a station (STA), a discovery frame including first information of a basic service set identifier (BSSID) and a service set identifier (SSID) and target beacon transmission time (TBTT) offset information from a candidate access point (AP), wherein the TBTT offset information indicates a time offset of a beacon frame relative to the discovery frame, wherein the beacon frame is a type of frame that is different from a type of frame of the discovery frame;

acquiring, by the STA, second information for a target AP based on identifier information which is generated from a physical layer of the STA;

determining, by the STA, whether the candidate AP is the target AP based on the first information and the second information;

if the candidate AP is the target AP, determining, by the STA, either a first scanning procedure or a second scanning procedure based on whether the time offset exceeds a predetermined value;

if the time offset exceeds the predetermined value, performing, by the STA, the first scanning procedure to associate with the target AP by transmitting a probe request frame including the first information without receiving the beacon frame; and if the time offset does not exceed the predetermined value, performing, by the STA, the second scanning procedure to associate with the target AP by receiving the beacon frame without transmitting the probe request frame.

2. The method of claim 1,
wherein the determining whether the candidate AP is the target AP includes:
determining, by the STA, whether the first information is included in the second information; and
determining, by the STA, that the candidate AP is the target AP, if the first information is included in the second information.

3. The method of claim 1,
wherein the discovery frame is transmitted with a shorter periodicity than a transmission periodicity of the beacon frame.

4. The method of claim 1,
wherein the probe request frame is transmitted as an unicast scheme to the target AP.

5. The method of claim 1,
wherein the identifier information is a MAC sublayer management entity (MLME) scan request primitive.

6. The method of claim 1,
wherein the discovery frame is received before a probe delay time is terminated, and
wherein the probe delay time is a time for sensing a channel before the STA transmits the probe request frame.

7. A station (STA) that performs scanning in a wireless local area network (WLAN), the STA comprising:
a radio frequency (RF) unit configured to receive a wireless signal; and
a processor operatively connected to the RF unit configured to:
receive a discovery frame including first information of a basic service set identifier (BSSID) and a service set identifier (SSID) and target beacon transmission time (TBTT) offset information from a candidate access point (AP), wherein the TBTT offset information indicates a time offset of a beacon frame relative to the discovery frame, wherein the beacon frame is a type of frame that is different from a type of frame of the discovery frame;
acquire second information for a target AP based on identifier information which is generated from a physical layer of the STA;
determine whether the candidate AP is the target AP based on the first information and the second information;
if the candidate AP is the target AP, determine either a first scanning procedure or a second scanning procedure based on whether the time offset exceeds a predetermined value;
if the time offset exceeds the predetermined value, perform the first scanning procedure to associate with the target AP by transmitting a probe request frame including the first information without receiving the beacon frame; and
if the time offset does not exceed the predetermined value, perform the second scanning procedure to associate with the target AP by receiving the beacon frame without transmitting the probe request frame.

8. The method of claim 7,
wherein the processor is configured to:
determine whether the first information is included in the second information; and
determine that the candidate AP is the target AP, if the first information is included in the second information.

9. The STA of claim 7,
wherein the discovery frame is transmitted with a shorter periodicity than a transmission periodicity of the beacon frame.

10. The STA of claim 7,
wherein the probe request frame is transmitted as an unicast scheme to the target AP.

11. The STA of claim 7,
wherein the identifier information is a MAC sublayer management entity (MLME) scan request primitive.

12. The STA of claim 7,
wherein the discovery frame is received before a probe delay time is terminated, and
wherein the probe delay time is a time for sensing a channel before the STA transmits the probe request frame.

* * * * *